United States Patent [19]

Igel et al.

[11] Patent Number: 4,487,449
[45] Date of Patent: Dec. 11, 1984

[54] VEHICLE ROOF CLOSURE PANEL ASSEMBLY HAVING PIVOTABLE RETAINER PLATES

[75] Inventors: Richard Igel, Germering; Alfons Lutz, Emmering; Hans Jardin, Inning; Klaus-Peter Srdinko, Unterschleissheim, all of Fed. Rep. of Germany

[73] Assignee: Webasto-Werk W. Baier GmbH & Co., Fed. Rep. of Germany

[21] Appl. No.: 388,621

[22] Filed: Jun. 15, 1982

[30] Foreign Application Priority Data

Jul. 28, 1981 [DE] Fed. Rep. of Germany ....... 3129658

[51] Int. Cl.³ .......................... B60J 7/00; E05C 3/04; E05C 21/02; E06B 3/00
[52] U.S. Cl. ..................................... 296/216; 296/218; 296/222; 296/201; 52/208; 49/465; 24/489; 24/514; 292/212
[58] Field of Search .................... 296/216–219, 296/224, 201, 146, 222; 52/200, 208, 213, 214, 202, 217; 49/504, 394, 465; 24/248 SA, 248 R; 292/256.5, 256.6, 256, 212, 206, 256.71, 256.75, 194; 403/405–407

[56] References Cited

U.S. PATENT DOCUMENTS

| | | | |
|---|---|---|---|
| 483,804 | 10/1892 | Glauber | 292/256 |
| 1,062,075 | 5/1913 | Arens | 292/212 |
| 1,797,765 | 3/1931 | Frank | 292/212 |
| 1,841,760 | 1/1932 | Olley | 292/212 |
| 2,242,503 | 5/1941 | Baule | 292/212 |
| 2,582,816 | 1/1952 | Bonnell | 292/256 |
| 2,849,764 | 9/1958 | Rich et al. | 49/465 |
| 3,616,956 | 11/1971 | Cooper | 49/465 |
| 3,974,753 | 8/1976 | Blomgren et al. | 296/218 |
| 4,186,525 | 2/1980 | Carvalho | 49/394 |
| 4,249,770 | 2/1981 | Hunt | 296/218 |
| 4,289,349 | 9/1981 | Symeonidis | 296/219 |
| 4,296,961 | 10/1981 | Hunt et al. | 296/218 |

*Primary Examiner*—Robert B. Reeves
*Assistant Examiner*—Dennis H. Pedder
*Attorney, Agent, or Firm*—Sixbey, Friedman & Leedom

[57] ABSTRACT

A vehicle roof provided with an opening closable by a cover and a frame of substantially U-shaped cross section extending along the edge of the roof opening. One side of the substantially U-shaped frame is higher than the other side thereof, and the higher side extends outside of the vehicle in the form of a flange for covering the edge of the vehicle roof defining the opening. A clamping arrangement for pressing the flange against the outer surface of the roof is provided, near the higher side, inside of the vehicle. To facilitate the installation of such a vehicle cover, especially in the case of a used vehicle, the clamping arrangement comprises a plurality of retaining plates which are pressed against the vehicle roof by screws. When the screws have been loosened, the retaining plates can be pivoted so that the frame can be introduced from outside of the vehicle into the roof opening without removing the retaining plates and screws.

13 Claims, 4 Drawing Figures

VEHICLE ROOF CLOSURE PANEL ASSEMBLY HAVING PIVOTABLE RETAINER PLATES

BACKGROUND AND SUMMARY OF THE INVENTION

The invention relates to a vehicle roof provided with an opening that is closable by a cover panel and a frame of substantially U-shaped cross section extending along the edge of the roof opening. One side of the U-shaped frame is higher than the other side thereof and the higher side extends, in the form of a flange outside of the vehicle, in a direction substantially perpendicular to said higher side so as to cover the edge of the surface of the vehicle roof adjacent to the opening. A clamping arrangement is mounted inside the vehicle to press the flange against the surface of the vehicle top.

A vehicle top of this type is known from U.S. Pat. No. 4,133,576. In this known vehicle top, the clamping arrangement connected to the top surface consists of a bar which penetrates an undercut groove of the frame and is provided with threaded holes. Screws placed in the threaded holes clamp the surface of the vehicle top between the flange and a sheet metal strip (see especially FIG. 10 of the U.S. patent). In the assembly operation, the frame is introduced from outside the vehicle into the prepared top opening. However, the clamping arrangement consisting of the bar, the screws, and the sheet metal strip must be removed for this purpose. It is only when the frame has been inserted that the fastening bar can be introduced into the undercut groove and the retaining screws can be tightened. For this reason, the assembly is time consuming and, therefore, expensive.

It is disclosed also in said U.S. patent that the frame is welded to the top surface (column 2, line 38). This joining method is complicated and costly.

An assembly ring for an openable automobile top, preferably a sliding top, is known from published European patent application No. 0,014,798. The assembly ring, provided with a flange covering the edge of the top surface, is connected to the top surface through the provision of holes bored therein and bolts of the flange determine the necessary application of pressure by the flange against the top surface when the nuts have been tightened. This type of assembly also requires a long time since holes must be drilled and the individual nuts must be tightened on said bolts.

In a vehicle roof provided with an opening closable by a cover, as described in German Application (Auslegeschrift) No. 2,615,276, the front edge of a cover is attached to the roof frame by a separable hinged connection along an axis perpendicular to the longitudinal axis of the vehicle, and the rear edge of the cover is pivotable upward and outward out of the plane of the roof by an extending arrangement which is separable from the cover. This vehicle roof also comprises a surrounding frame of U-shaped cross section. The frame is welded from the inside to the fixed top surface. The welding must be completed before the painting operation because, otherwise, the vehicle paint would be damaged. Therefore, this known construction cannot be mounted on a used vehicle. Furthermore, the welding operation complicates and increases the cost of the installation.

The same consideration applies to the liftable roof panel known from German Pat. No. 2,331,329, wherein the only difference lies in the structure of the extending mechanism.

Thus, a principal object of the present invention is to develop a vehicle provided with a roof opening of the above-cited type, in which the installation, including installation on a used vehicle, is conducted with a minimum of operations.

This object is achieved, in accordance with a preferred embodiment, by a clamping arrangement formed of a plurality of retaining plates which are pressed against the surface of the vehicle roof by screws. When the screws have been loosened, the plates can be pivoted about a longitudinal axis, so that the surrounding frame can be introduced into the top opening from the outside of the vehicle.

In the practice of the present invention, a vehicle roof, provided with a closable opening, can be fabricated prior to installation. To the extent possible, the screws used to fasten the retaining plates are backed out of their threaded holes, so that the retaining plates can be pivoted about their longitudinal axis. When the frame is introduced into the cut-out roof opening, the retaining plates come into contact with the edge of the roof surface and are pressed inward thereby. It is only when the frame is completely seated in the opening in the top surface that the retaining plates drop outward by gravity. If the screws designed to fasten the retaining plates are then tightened, the plates are pressed from the inside of the vehicle against the roof. Therefore, the flange of the frame is pressed on the outside against the surface of the vehicle roof to provide for a sealed fit of the frame on the roof surface. Existing roof reinforcements constitute no obstacle, but can be utilized as abutments for the retaining plates, conceivably after said reinforcements have been flattened.

The invention can be applied in combination with vehicle roofs of all types when they are provided with an opening that is closable by a cover. These covers may be removable cover panels or liftable cover panels of any type. For example, the cover can be pivoted by two hinges on the front edge of the top opening. In another example, the cover front and rear edges can be extended outward by two telescopic jacks. When the cover is pivotable about its front edge, for example, a linkage similar to that disclosed in the above-cited German Application No. 2,615,276 can be used.

According to one especially advantageous feature of the invention, the retaining plates present a V-shaped cross section, the angle between the two sides of the V being obtuse, and openings, for example, circular or oblong holes, are provided on one of the two sides of the plates. The length of the retaining plates can be determined so that one or more plates are provided along one edge of the top opening. The V-shaped structure of the retaining plates is especially suited to rapid installation. When slots are provided in one side of the V-shaped retaining plates, said plates can be fixed by screws. Because of the elongated shape of the screw holes, the retaining plates are easily pivoted on introduction into the opening in the vehicle roof after the fastening screws have been inserted.

According to another especially advantageous feature of the invention, in the corner between the upper side of the U-shaped member and the flange, the frame has a block provided with a recess whose side walls are perpendicular to the surface of the flange. This recess is especially designed to receive the retaining-plate fastening screws. The screws may cut their own thread in the recess, or incomplete threads may be present in the recess. The block is used also as abutment for one edge of the retaining plate as said plate is being secured by the screws.

According to yet a further advantageous feature, the frame is provided with a groove containing a seal on the side of the flange, which extends over the roof surface. This seal provides for an especially tight sealing of the frame on the roof surface.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
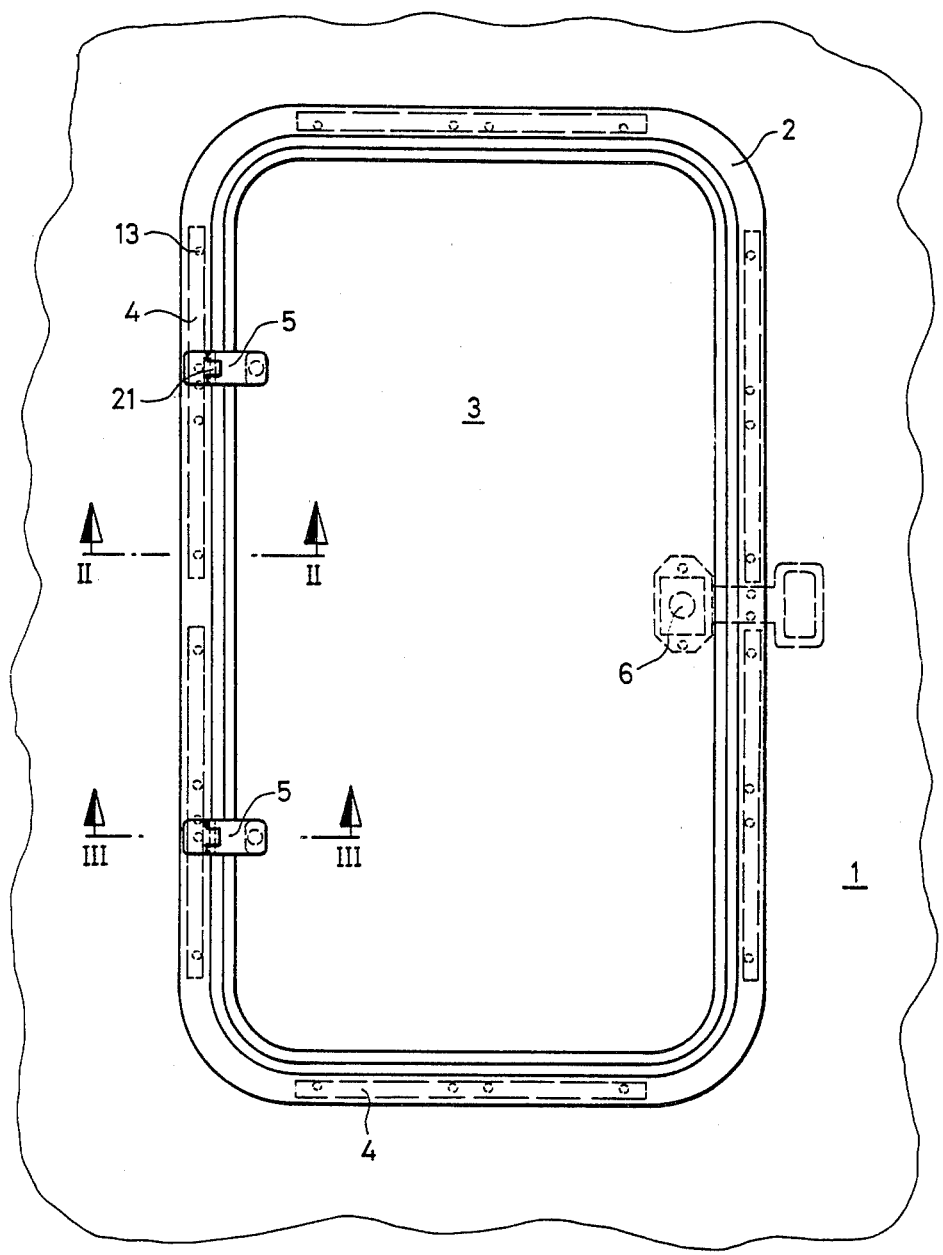
FIG. 1 is a plan view of a vehicle roof incorporating the invention.

The surface 1 of the vehicle roof is provided with an opening. A holding frame 2 is mounted in said opening. The holding frame 2 is annular in shape surrounding an aperture defined thereby and carries, in sealing conditions, a cover panel 3 made of transparent acrylic resin or metal within said aperture. Frame 2 is secured to roof 1 by retaining plates 4 which extend lengthwise (i.e., in the direction of their major axis) parallel to the respectively adjoining edges of the roof opening. Cover panel 3 is pivotable about an axis located at its front edge. For this purpose, the cover panel is connected to the front portion of the frame by two hinges 5. A schematically represented telescopic jack 6 is used to pivot the cover outward. A folding handle can be used instead of the telescopic jack.

Figure 2:
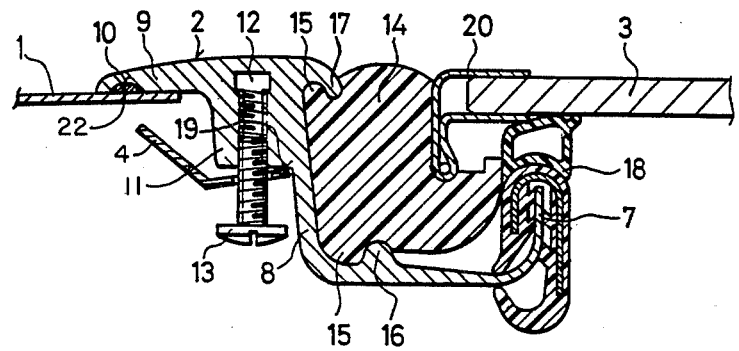
FIGS. 2 and 2a are views showing a section along line II—II in FIG. 1, the retaining plate being loosely seated and in the case of FIG. 2a, the roof being partially inserted from the vehicle exterior.
Figure 2A:
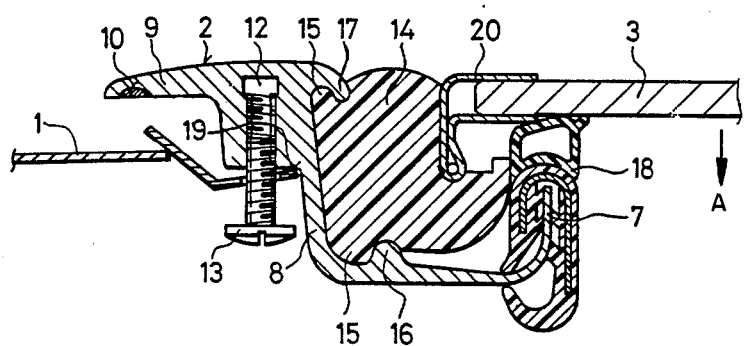
Figure 3:
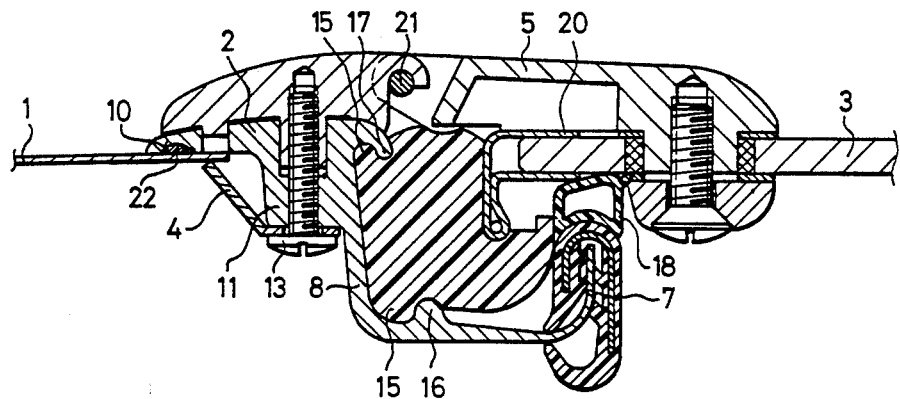
FIG. 3 is a section along line III—III in FIG. 1, the retaining plate being secured.

The structure of the vehicle roof structure of the invention is illustrated with special clarity in the sectional drawings of FIGS. 2 and 3. In FIG. 2, the roof is again designated by reference numeral 1. Frame 2 is seated in an opening of the roof. This frame is preferably made of aluminum and has a substantially U-shaped cross section. The side 7 of the U-shaped member, located nearer the center of the roof opening, is shorter than the outer side 8, that is located nearer the edge of the roof defining the opening. Outer side 8 extends around the periphery of the roof opening in the form of a flange 9, which lies on top of the outer surface of roof 1. Flange 9 is provided with a groove 10 in which a seal 22 can be seated. In the corner between flange 9 and side 8, a block 11 is formed having a recess 12. Screws 13 are threaded in block 11 and cut their own thread in recess 12. Screws 13 extend outwardly passing through holes or slots in a wall of the V-shaped retaining plates 4. In the illustration of FIG. 2, a screw 13 has been moved back out of the thread in the recess to a point where it is still securely held. Then, the free side of retaining plate 4 can come into contact with the side of block 11. In this position, frame 2 can be introduced, from above (arrow a, FIG. 2a), into the roof opening without removing screws 13 and plates 4, the retaining plates pivoting out of the way, due to the noted contact, in paths of movement within respective planes oriented (as apparent from a comparison of FIGS. 2 and 3) substantially normal to the surface of the roof. As noted in the summary of the invention, such pivoting is facilitated by the use of holes or slots which are elongated, i.e., the screws 13 pass through with the retaining plates 4 with sufficient clearance to enable the desired pivotal movement of the plates relative to the screws.

FIG. 2 shows also the cover 3 made of transparent acrylic resin or metal. The cover 3 is provided with an edge 20 with which it rests on a seal 14. Seal 14, which is preferably made of rubber, is seated in the U-shaped portion of frame 2 and its bulging portion 15 extends behind two projections 16 and 17 to provide for a firm seat. Cover 3 is connected to frame 2 over another seal 18 in contact with the shorter side 7 of said frame 2.

The section represented in FIG. 3 extends through one of the hinges 5. This hinge is formed of two elements that are mutually pivotable about a pin 21. One of the two hinge elements is bolted to the flange 9 of frame 2 and the other is bolted to cover 3. In the illustrated embodiment, two hinges 5 are provied at the front edge of the cover (FIG. 1).

In the illustration of FIG. 3, screw 13 has been tightened and retaining plate 4 has been pressed home. As clearly shown in FIG. 2, one outer edge of retaining plate 4 abuts in the angle between block 11 and frame side 8 at a point 19. When screw 13 is is tightened, plate 4 pivots about the abutment point 19 so as to execute the above-noted path of movement in respective planes oriented normal to the roof, so that the free end of plate 4 moves toward the inner surface of roof 1. The pressure applied by retaining plate 4 on the interior of roof 1, and, therefore, the pressure applied by frame 2 on the outer surface of roof 1, can be adjusted by tightening screw 13, so as to assure a tight, leak-free fit between the frame 2 and roof 1.

It should be appreciated that, while the invention has been described with reference to a preferred embodiment in the form of a vehicle roof construction of a typical "sun roof" type, the present invention is equally useful in connection with swing-out windows and the like, as might be used in van conversions, since the frame and retaining plates, without modification, may as easily be mounted (in the above-described manner) in sealing relationship within a side panel of a van or other vehicle body as in a roof.

While we have shown and described a single embodiment in accordance with the present invention, it is understood that the same is not limited thereto, but is susceptible of numerous changes and modifications as known to those skilled in the art and we, therefore, do not wish to be limited to the details shown and described herein, but intend to cover all such changes and modifications as are encompassed by the scope of the appended claims.

We claim:

1. A vehicle roof provided with an opening that is closable by a cover, a frame of substantially U-shaped cross section, extending along the edge of the roof defining said opening, an outer side of the U-shape of the frame being higher than an inner side thereof, the higher side having a flange-like extension overlying and covering the edge of the roof, and a clamping arrangement mounted for pressing the flange against the surface of the vehicle roof; wherein the clamping arrangement comprises a plurality of retaining plates each having a major axis extending parallel to an adjoining edge of the roof opening and mounting screws passing through a wall of the retaining plates for attaching the retaining plates to said frame, the retaining plates and screws being constructed and arranged in a manner enabling pivotal displacement of the retaining plates, in respective planes oriented substantially normal to an interior surface of the roof, to a position which will permit the penetration of the frame into the opening, from the outside of the vehicle, with the screws loosened and the retaining plates attached, as well as toward said interior surface upon tightening of said screws after penetration of the frame into the opening, for pressing the retaining plates against said interior surface.

2. The vehicle roof as in claim 1, wherein the retaining plates have a V-shaped cross section, the angle between sides defining the V-shape being obtuse; and wherein holes for said screws are provided in one of the two sides defining the V-shape.

3. The vehicle roof as in claim 1 or 2, wherein a block is provided in a corner of the frame between the higher side and the flange, said block having a recess for receiving said screws, side walls of the recess being oriented substantially perpendicular to the surface of the flange.

4. The vehicle roof as in claim 1 or 2, wherein a side of the flange-like extension overlying the roof is provided with a groove containing a seal.

5. The vehicle roof as in claim 3, wherein a side of the flange-like extension overlying the roof is provided with a groove containing a seal.

6. The vehicle roof according to claim 1, wherein hinge elements for the cover are engaged upon a top surface of portions of said flange-like extension and are secured thereto by mounting screws for respective retaining plates located on the underside of said portions.

7. The vehicle roof according to claim 1, wherein said flange extends around the periphery of said opening and said plurality of retaining plates are spaced thereabout.

8. A closure assembly for mounting within an exterior body panel of a vehicle, comprising an annular frame of substantially U-shaped cross section surrounding an aperture defined thereby, a closure member connected to the frame for opening and closing said aperture, and a clamping arrangement for engaging a vehicle body panel and securing said frame within an opening thereof; wherein an outer side of the U-shape of the frame is higher than an inner side thereof, the higher side having a flange-like extension for overlying and covering the edge of the vehicle body panel defining said opening; and wherein the clamping arrangement comprises a plurality of retaining plates and mounting screws for the retaining plates, said screws being constructed and arranged so as to pass through a wall of said retaining plates with sufficient clearance to enable pivotal displacement of the retaining plates relative to the screws, in respective planes oriented substantially normal to an interior surface of the roof, to a position which will permit the penetration of the frame into the opening, from the outside of the vehicle, with the screws loosened and the retaining plates attached, as well as toward said interior surface upon tightening of said screws after penetration of the frame into the opening, for pressing the retaining plates against said interior surface.

9. The closure assembly according to claim 8, wherein the retaining plates have a V-shaped cross section, the angle between sides defining the V-shape being obtuse; and wherein holes for said screws are provided in one of the two sides defining the V-shape.

10. The closure assembly according to claim 8 or 9, wherein the closure member is connected to the frame by hinges having elements which are engaged upon a top surface of portions of said flange-like extension and are secured thereto by mounting screws for respective retaining plates located on the underside of said portions.

11. The closure assembly according to claim 10, wherein the closure member is a transparent panel.

12. The closure assembly of claim 9, wherein said holes are elongated.

13. The vehicle roof according to claim 2, wherein said holes are elongated.

* * * * *